(12) United States Patent
Kobayashi

(10) Patent No.: US 6,905,347 B2
(45) Date of Patent: Jun. 14, 2005

(54) ELECTRICAL JUNCTION BOX WITH CONNECTOR AND FUSE MODULES

(75) Inventor: Nobuchika Kobayashi, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 10/679,473

(22) Filed: Oct. 7, 2003

(65) Prior Publication Data

US 2004/0219806 A1 Nov. 4, 2004

(30) Foreign Application Priority Data

Nov. 8, 2002 (JP) ........................................ 2002-325472

(51) Int. Cl.[7] .......................... H01R 12/00; H05K 1/00
(52) U.S. Cl. .................................................... 439/76.2
(58) Field of Search .................. 439/76.2; 174/52.1, 174/60; 361/784, 686

(56) References Cited

U.S. PATENT DOCUMENTS

| | | | | |
|---|---|---|---|---|
| 4,689,718 A | * | 8/1987 | Maue et al. ................. | 361/686 |
| 5,742,005 A | * | 4/1998 | Saka et al. .................. | 174/52.1 |
| 6,506,060 B2 | | 1/2003 | Sumida et al. | |
| 6,514,091 B2 | | 2/2003 | Saito et al. | |
| 6,700,795 B1 | * | 3/2004 | Jones et al. ................. | 361/784 |
| 2002/0157852 A1 | * | 10/2002 | Chiriku et al. ................ | 174/60 |
| 2003/0082937 A1 | * | 5/2003 | Burdick ..................... | 439/76.2 |

* cited by examiner

*Primary Examiner*—Chandrika Prasad
(74) *Attorney, Agent, or Firm*—Oliff & Berridge, PLC

(57) ABSTRACT

Fuse bus bars in a fuse module are provided with press contact terminals that are connected to terminals of each fuse and are disposed closely in parallel with each other. If there are some circuits to be connected and the other circuits to be divided in all circuit specifications in the different kinds of and same kind of automobile vehicles that mount junction boxes, the fuse bus bars constituting the circuits are integrally connected by bridging portions. If the circuits are required to be divided in accordance with the circuit specification of the automobile vehicle mounting the fuse bus bars, an alteration of circuit can be carried out by cutting off the bridging portion.

3 Claims, 5 Drawing Sheets

|   | a | b | c | d | e |
|---|---|---|---|---|---|
| A | × | ○ | ○ | ○ | × |
| B | ○ | × | ○ | ○ | × |
| C | ○ | ○ | × | ○ | × |
| D | × | ○ | ○ | × | ○ |
| E | ○ | × | ○ | × | ○ |
| F | ○ | ○ | × | × | ○ |

ELECTRICAL JUNCTION BOX WITH CONNECTOR AND FUSE MODULES

BACKGROUND OF THE INVENTION

1. Field of Invention

This invention relates to a junction box and more particularly relates to a junction box that is connected to a wire harness for an automobile vehicle and can easily change a circuit design. The present application claims priority to Japanese Application No. 2002-325472 filed on Nov. 8, 2002.

2. Description of Prior Art

Recently, as electrical components installed on an automobile vehicle have suddenly increased, circuits to be contained in a junction box have suddenly increased. In order to form branched circuits at a high density, the number of parts has extremely increased. This requires very many assembling steps.

The present applicant has proposed a junction box (Japanese Patent Public Disclosure 2001-359227), as shown in FIG. 7, in order to form a thin type junction box, to easily change a circuit design and to reduce assembling steps.

For convenience of explanation, a prior art junction box will be described by referring to FIGS. 7 and 8. FIG. 7 is an exploded perspective view of a conventional junction box. FIG. 8 is a perspective view of a part of a conventional connector module, illustrating problems in the module.

In a junction box 1, a connector connection circuit section (base circuit section), a fuse connection circuit section, and a relay connecting circuit section are divided into a connector module 2, a fuse module 3, and a relay module 4. These modules 2, 3, and 4 are assembled in a casing including an upper casing member 5 and a lower casing member 6.

In the connector module 2, bus bars 7 punched out into a desired circuit pattern from a sheet of a conductive metal plate are disposed on an insulation board 8 and a plurality of combinations of the bus bars 7 and insulation boards 8 are laminated on one another so that ends of the bus bars 7 project from peripheral edges of the insulation boards 8. In the fuse module 3 and relay module 4, bus bars 3b and 4b are secured to base plates 3a and 4a, respectively so that ends of the bus bars 3b and 4b project from peripheral edges of the base plates 3a and 4a. The ends of the bus bars 3b and 4b are connected to the ends of the bus bars 7 of the connector module 2 to form an electrical connection.

In the case where the junction box is divided into the connector module, fuse module, and relay module, the connector connection circuit, fuse connection circuit, and relay connecting circuit are also divided. Accordingly, only the corresponding module is changed, if a specification in the connector circuit, the fuse circuit, or the relay circuit is changed. Consequently, it is possible to easily comply with an alteration of specification.

Since the division of the circuits can eliminate overlap of tabs of the bus bars and avoid multiple layers of the bus bars, it is possible to reduce a thickness of the junction box. Furthermore, since an arrangement of the bus bars can be simplified, it is possible to reduce an area of the bus bars and suppress an increase of an area of the junction box.

However, in the case of changing circuits in the junction box 1, although only the corresponding modules 5, 6, and 8 are altered and a whole of the junction box 1 is not altered, at least one of the modules 5, 6, and 8 must be newly formed.

Furthermore, in the case of changing the circuits in accordance with a specification of an automobile vehicle mounting the junction box, it is necessary to prepare a certain kind of module every specification. This will increase the number of kinds of parts and the load of controlling the number of parts.

In order to overcome the above problems, as shown in FIG. 8, bus bars 7a-1 and 7a-2 in the connector module 2 are connected to each other by a bridging portion 7a-3 and the bridging portion 7a-3 may be either cut off or retained in accordance with the specification of an automobile vehicle to comply with an alteration of circuit design.

However, it is necessary to dispose the bus bars 7a1 and 7a-2 adjacent to each other in order to connect them by the bridging portion 7a-3. It is impossible to provide the bridging portion between a bus bar 7b and a bus bar 7c on different layers due to their structures. On the other hand, it is difficult to design the bus bars on a single layer to set the bridging portions. Even if such design is carried out, the number of stacked layers including the bus bars 7 and insulation boards 8 must be increased. This involves a problem of an increase in cost. Accordingly, there are limitations in the number of the patterns to provide changeable circuit patterns by selectively cutting off the bridging portions in the stacked circuits including the insulation boards 8 and bus bars 7a to 7b.

SUMMARY OF THE INVENTION

In view of the above problem, an object of the present invention is to provide a junction box that can easily alter a circuit design without increasing the number of stacked layer including the bus bars and insulation boards.

In order to solve the above problems, the present invention is directed to a junction box wherein a connector connection circuit section and a fuse connection circuit section adapted to be contained in the junction box are divided into a connector module and a fuse module separately and circuits in the modules are connected to one another. The connector module includes stacked circuit boards, each of which has a first insulation board and bus bars secured to the first insulation board. The fuse module includes a second insulation board and fuse bus bars that are secured to the second insulation board and are connected to terminals of each fuse. The fuse bus bars in the fuse module are provided with press contact terminals that are connected to terminals of each fuse and are disposed closely in parallel with each other. If there are some circuits to be connected and the other circuits to be divided in all circuit specifications in the different kinds of and same kind of automobile vehicles each of which mounts a junction box, the fuse bus bars constituting the circuits are integrally connected by bridging portions. If the circuits are required to be divided in accordance with the circuit specification of the automobile vehicle mounting the fuse bus bars, an alteration of circuit can be carried out by cutting off the bridging portions.

According to the above structure, it is possible to realize a plurality of circuit patterns by utilizing only a single kind of a fuse bus bar either by retaining the bridging portions of the fuse bus bars or by cutting off the bridging portions. Consequently, it is not necessary to produce a new module together with a new junction box upon alteration of circuit design. This will reduce kinds of parts and the load of controlling product numbers and lower a cost in parts.

In addition, the bridging portions for dividing the circuits in the present invention are provided on the fuse bus bars in the fuse module to which input and output sections of circuits are connected in parallel. The bus bars to be connected by the bridging portions are disposed in parallel and are not dispersed in different layers in comparison with a circuit that utilizes the connector module. This will make it easy to set the bridging portions. It is also possible to provide more circuit patterns in compliance with an alteration of specification.

Even if a plurality of bridging portions for dividing the circuits are set in accordance with the specification of an automobile vehicle, the number of stacked layers of the insulation boards and bus bars in the connector module is not increased, an arrangement density of bus bars can be enhanced, and an increase in cost and upsizing of a junction box can be prevented.

BRIEF DESCRIPTION OF THE DRAWINGS

The features of the present invention believed to be novel and the elements characteristic of the present invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF PREFERRED EMBODIMENTS

Figure 1:
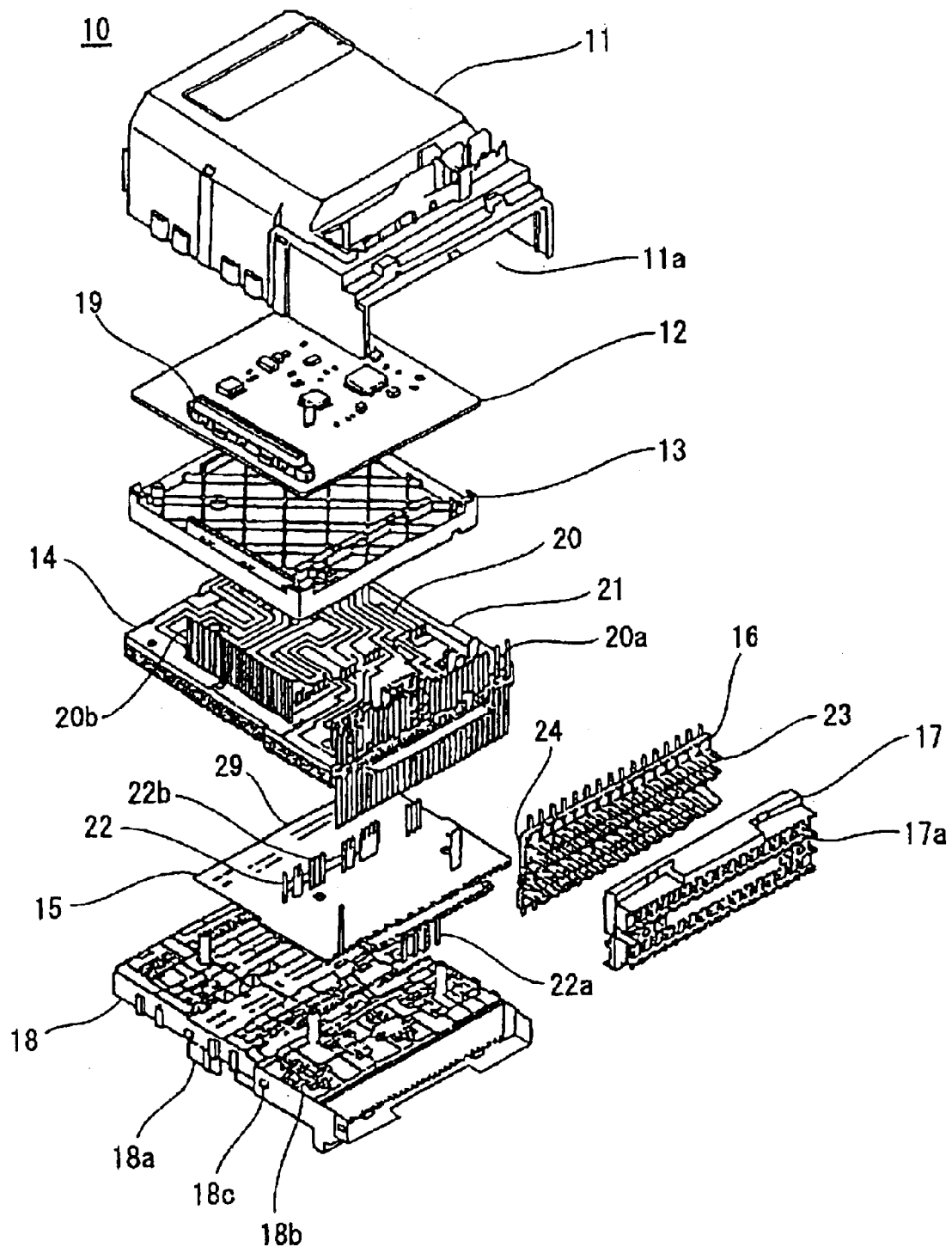
FIG. 1 is an exploded perspective view of an embodiment of a junction box in accordance with the present invention.

In describing the preferred embodiment of the present invention, reference will be made herein to FIGS. 1 to 6 of the drawings in which like numerals refer to like features of the invention. Features of the invention are not necessarily shown to scale in the drawings.

Referring now to FIGS. 1 to 6, an embodiment of a junction box in accordance with the present invention will be explained below.

FIG. 1 is an exploded perspective view of a junction box 10 to be connected to a wire harness for an automobile vehicle.

In FIG. 1, the junction box 10 includes an upper casing member 11, an electronic control unit (ECU) 12, an insulation board 13, a connector module 14, a relay module 15, a fuse module 16, and a fuse casing 17, and a lower casing member 18.

The relay module 15, connector module 14, insulation board 13, and electronic control unit 12 are arranged in a vertical direction (in FIG. 1) on the lower casing member 18 in order. The upper casing member 11 is mounted on the lower casing member 18. The upper casing member 11 is provided in a short side of a peripheral wall thereof with a side opening 11a. The fuse module 16 is attached to the side opening 11a in a horizontal direction (in FIG. 1).

The upper casing member 11 is provided on an inner surface of each long side thereof with latch portions (not shown) that are adapted to be locked on the lower casing member 18. The lower casing member 18 is provided with locking pawls 18c that engage the latch portions on the upper casing member 11 so that the upper casing member 11 is coupled to and locked on the lower casing member 18. The electronic control unit 12, insulation board 13, connector module 14, and relay module 15 are contained in the interior defined by the upper and lower casing members 11 and 18.

The lower casing member 18 is also provided with a plurality of connector receiving sections 18a to be coupled to the connector module 14 and a plurality of relay receiving sections 18b to be coupled to the relay module 15.

The fuse module 16 is attached to the side opening 11a so as to be disposed on a side surface of the connector module 14. The fuse module 16 contains an insulation board 24 to which fuse bus bars 23 (25 to 28) are secured. The fuse bus bars 23 (25 to 28) are connected to a pair of terminals 30a and 30b of each of fuses 30 (see FIG. 6) that are connected to juxtaposed fuse receiving sections 17a in a fuse casing 17.

The fuse bus bars 23 include input side bus bars 25 and 26 and output side bus bars 27 and 28. Ends of the bus bars 25 to 28 project into the respective fuse receiving sections 17a in an upper stage X and a lower stage Y in the fuse casing 17.

Figure 2:
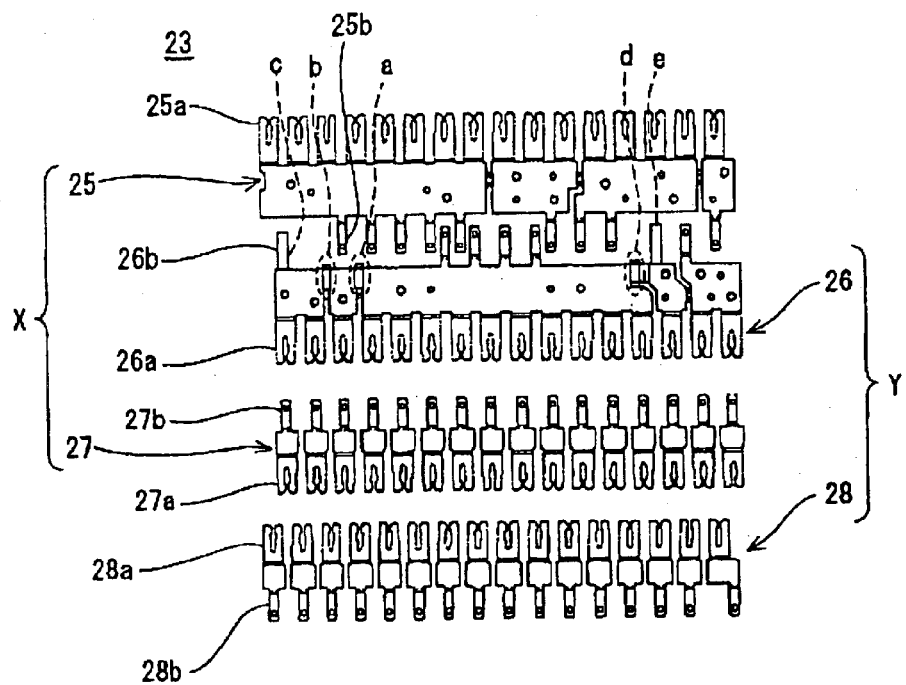
FIG. 2 is a developed view of fuse bus bars for a fuse module.

In more detail, FIG. 2 shows fuse bus bars 23 punched out from a sheet of a conductive metal plate and developed in a plane. The input side bus bars 25 and 26 on the upper stage X and the lower stage Y are provided with a plurality of press contact terminals 25a and 26a and a plurality of fuse side welding tabs 25b and 26b. The terminals and tabs are made from a single metal plate. The first input side bus bars 26 are provided on the given positions with bridging portions a, b, and d to be cut off while some of the fuse side welding tabs 26b serve as tabs c and e to be cut off (hereinafter referred to "cut tab" or "cut tabs").

The output side bus bars 27 and 28 are provided on the respective metal plate with press contact terminals 27a and 28a, fuse side welding tabs 27b and 28b.

Figures 5, 6:
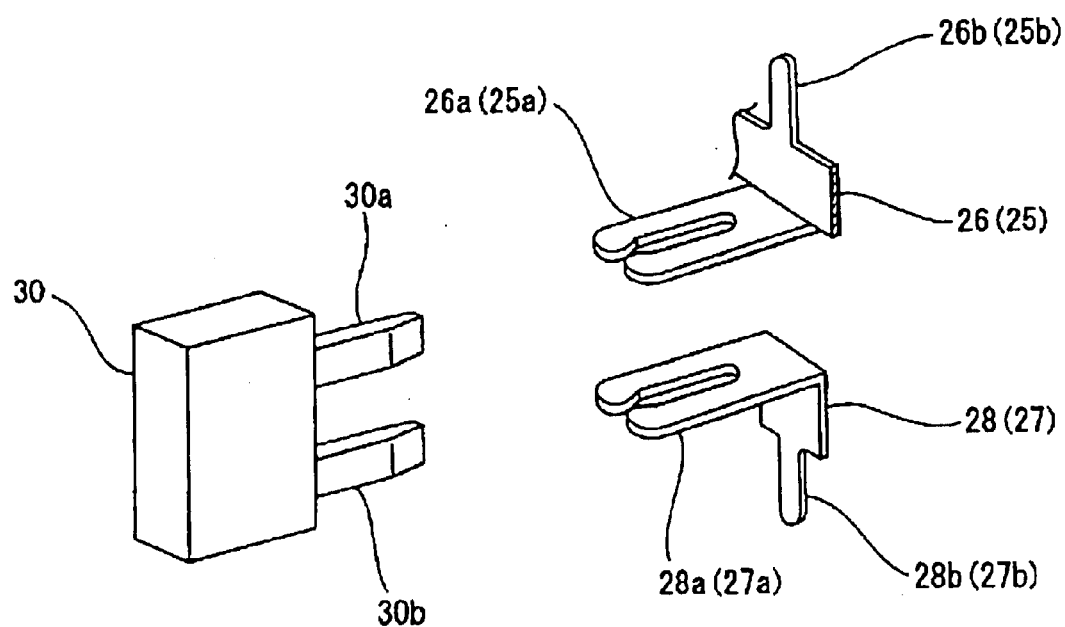
FIG. 5 is an explanatory view illustrating patterns of bridging portions to be divided.
FIG. 6 is an exploded perspective view of a fuse module, illustrating a connection between a fuse and a fuse bus bar.
Figure 7:
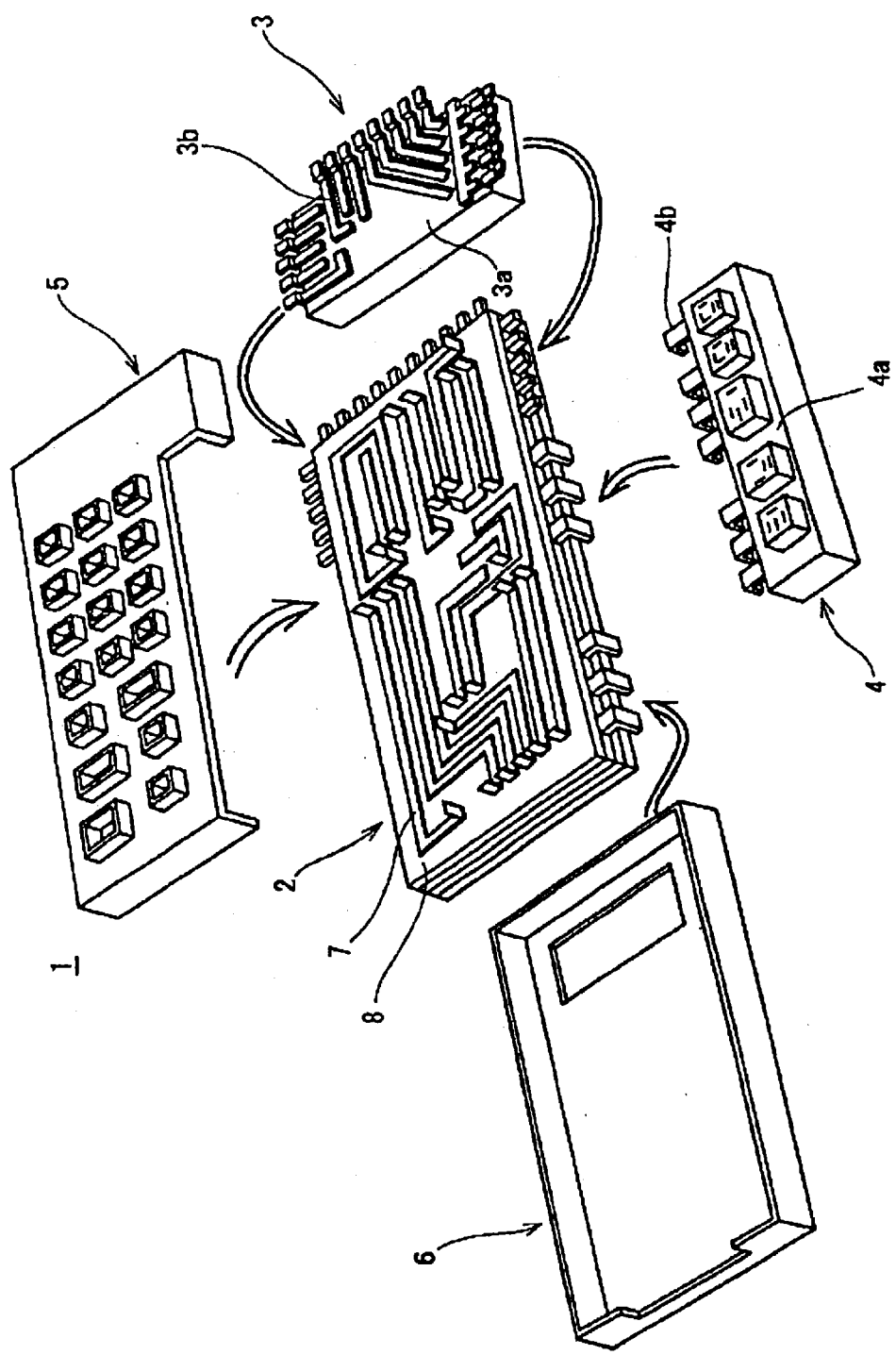
FIG. 7 is an exploded perspective view of a conventional junction box.

The fuse bus bars 23 are shown in FIG. 6 as typical bus bars 26 and 28 on the lower stage Y. The bus bars 26 and 28 are folded to a horizontal direction to form press contact terminals 26a and 28a. A pair of terminals 30a and 30b of a fuse 30 to be inserted into the fuse receiving section 17a are forcibly fitted into the press contact terminals 26a and 28a. The similar structure will be applied to the bus bars 25 and 27 on the upper stage X in the fuse casing 17.

The fuse side welding tabs 25b to 28b are juxtaposed on a straight line and secured to one another by resistant welding so that the tabs 25b to 28b are opposed to the connector side welding tabs 20a of the bus bars 20 in the connector module 14.

The fuse casing 17 is provided with juxtaposed multiple fuse receiving sections 17a to close the side opening 11a. The fuse casing 17 is locked on the upper and lower casing members 11 and 18.

The connector module 14 includes circuit boards that are stacked on one another in plural layers. Each of the circuit boards includes an insulation board 21 to which bus bars 20 for connectors are secured. The bus bars 20 are formed by punching out a sheet of a conductive metal plate into a circuit having a given configuration. Tabs project from the bus bars 20 on the circuit board (or through bus bars 22 in the relay module 15) and enter the connector receiving section 16d on the lower casing member 18.

The connector module 14 opposed to the fuse module 16 is provided on a side with a plurality of connector side welding tabs 20a that are formed by folding ends of the bus bars 20 upward and downward in an L-shape and are disposed on a straight line.

The relay module 15 includes the bus bars 22 molded in the insulation board 13. Relays (not shown) are mounted on a bottom surface of the insulation board 13. Terminals of the relays are connected to the bus bars 22 by soldering.

An end of each bus bar 22 is folded upward and is connected to each bus bar 20 in the connector module 14. The other end of each bus bar 22 projects downward from a side of the fuse module 16 and is opposed to each connector side welding tab 20a in the connector module 14 on a straight line to serve as a relay side welding tab 22a.

The electronic control unit (ECU) 12 includes electronic parts mounted on a base plate. The insulation board 13 is disposed between the electronic control unit 12 and the connector module 14.

Printed circuit conductors are juxtaposed on an end side of the base plate and are connected to vertical intermediate terminals (not shown) in an ECU connector 19. A lower end of each intermediate terminal is connected to the tab 20b of each bus bar 20 in the connector module 14.

The fuse module 16 is disposed in the junction box 10 so that the fuse side welding tabs 25a to 28a in the fuse module 16 are opposed to the connector side welding tabs 20a projecting from a side of the connector module 14. The connector side welding tabs 20a juxtaposed on a straight line are superimposed on and welded to the fuse side welding tabs 25a to 28a successively.

The connector side welding tabs 20a and lower side welding tabs 27a and 28a are superimposed on the relay side welding tabs 22a in the relay module 15 and the connector side welding tabs 20a are interposed between the fuse side welding tabs 27a and 28a and the relay side welding tabs 22a to form a triple layer. The tabs in the triple layer are welded together.

The fuse casing 17 is put on the fuse module 16 disposed vertically on a side of the connector module 14. The press contact terminals 25a to 28a in the fuse module 16 are inserted into the fuse receiving sections 17a.

Under this condition, the upper and lower casing members 11 and 18 are interlocked together so that the upper and lower casing members 11 and 18 enclose the fuse casing 17.

Figure 3:
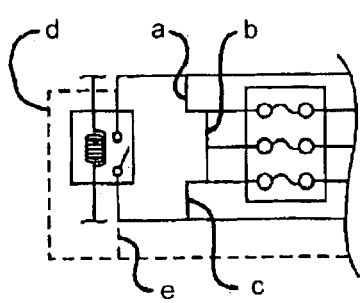
FIG. 3 is a schematic diagram of a circuit.
Figure 8:
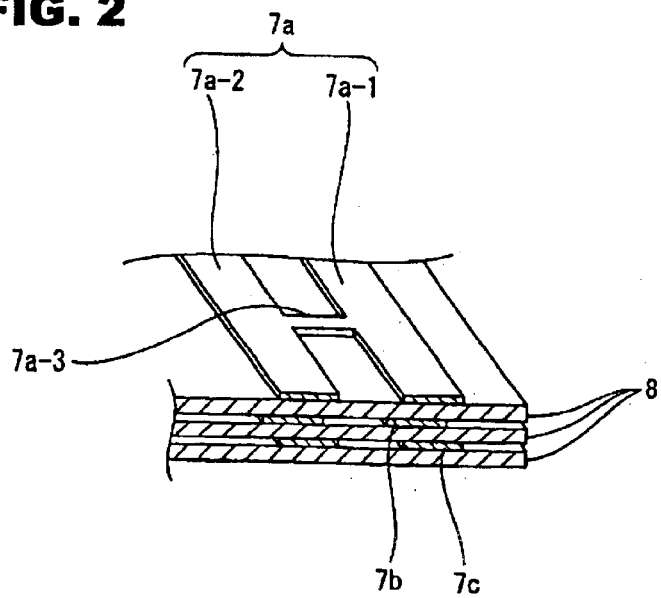
FIG. 8 is a perspective view of a part of a conventional connector module, illustrating problems in the module.

FIG. 3 shows a schematic diagram of a circuit to be altered by selectively cutting off the bridging portions a, b, and d of the fuse bus bars 23 in the fuse module 16 and the cut tabs c and e. Contact sections of relays are connected to the downstream of the fuse bus bars 23. FIG. 5 shows a table of selective cutting patterns of the bridging portions a, b, and d and cut tabs c and e. In FIG. 5, a round mark "O" designates a state in which the portions or tabs are not still cut off and a cross mark "X" designates a state in which the portions or tabs have been already cut off.

Figure 4A:
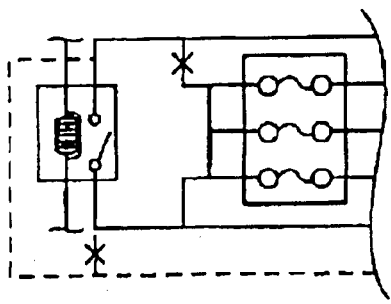
FIGS. 4A to 4F are schematic diagrams illustrating various circuit patterns.

For instance, in the case of pattern A, the bridging portion a and the cut tab e are cut off while the bridging portions b and d and the cut tab c are retained or not cut off to form a circuit shown in FIG. 4A.

Figure 4B:
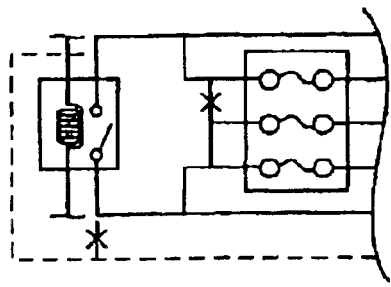
Figure 4C:
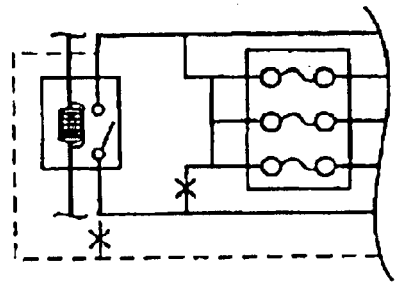
Figure 4D:
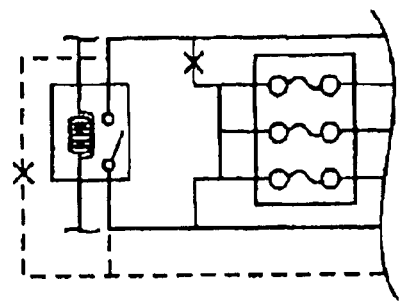
Figure 4E:
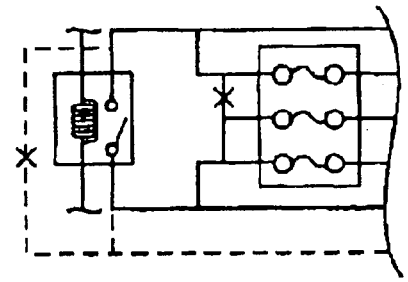
Figure 4F:
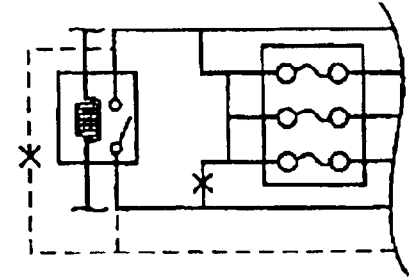

Also, in the case of pattern B, the bridging portion b and the cut tab e are cut off while the bridging portions a and d and the cut tab c are not cut off to form a circuit shown in FIG. 4B. In the case of pattern C, the cut tabs c and e are cut off while the bridging portions a, b, and d are not cut off to form a circuit shown in FIG. 4C. In the case of pattern D, the bridging portions a and d are cut off while the bridging portion b and the cut tabs c and e are not cut off to form a circuit shown in FIG. 4D. In the case of pattern E, the bridging portions b and d are cut off while the bridging portion a and the cut tabs c and e are not cut off to form a circuit shown in FIG. 4E. In the case of pattern F, the bridging portion d and the cut tab c are cut off while the bridging portions a and b and the cut tab e are not cut off to form a circuit shown in FIG. 4F.

The patterns A and D, in which the bridging portion a is cut off, will form a door circuit corresponding to a specification in which the ECU is disposed in only a driver's seat. The patterns B and E, in which the bridging portion b is cut off, will form a door circuit corresponding to a specification in which the ECU is disposed in each of driver's seat and passenger's seat. The patterns C and F, in which the cut tab c is cut off, will form a door circuit corresponding to a specification in which the ECU is disposed in each of four doors.

Also, the patterns A to C, in which the cut tab e is cut off, will form a roof circuit corresponding to a specification in which an output of a power source is disposed at an upstream from the relay. The patterns D to F, in which the bridging portion d is cut off, will form a roof circuit corresponding to a specification in which an output of a power source is disposed at a downstream from the relay.

Thus, it possible to form different circuits having patterns A to F by selectively cutting off the bridging portions a, b, and d, and/or the cut tabs c and e. It is possible to easily carry out an alteration of circuit design while maintaining a single kind of bus bars 23.

Consequently, it is not necessary to produce new modules 14, 15, and 16 together with a new junction box 10 upon alteration of circuit design. This will reduce kinds of parts and the load of controlling product numbers and lower cost in parts.

Also, the bus bars 20 in the connector module 14 are arranged in given circuit configurations and are stacked through the insulation board 13. In the case where a plurality of bridging portions for selectively cutting the circuits are provided on the bus bars 20 in the connector module 14, it is difficult to design all bus bars on the same layer adjacent to one another and it is necessary to increase the number of layers. This will increase cost. However, because the bridging portions a, b, and d and the cut tabs c and e are provided on the fuse bus bars 23 in the fuse module 16 in which input and output sections of circuits extend in parallel with each other, it is possible to easily set the bridging portions a, b, and d and the cut tabs c and e continuously.

Accordingly, even if a plurality of bridging portions a, b, and d for dividing the circuits are set in accordance with the specification of an automobile vehicle, the number of stacked layers of the insulation board 13 and bus bars 20 in the connector module 14 is not increased, an arrangement density of bus bars 20 can be enhanced, and an increase in cost and upsizing of a junction box 10 can be prevented.

The entire disclosure of Japanese Patent Application No. 2002-325472 filed on Nov. 8, 2002 including the specification, claims, drawings and summary is incorporated herein by reference in its entirety.

While the present invention has been particularly described, in conjunction with a specific preferred embodiment, it is evident that many alternatives, modifications, and variations will be apparent to those skilled in the art in light of the foregoing description. It is therefore contemplated that the appended claim will embrace any such alternatives, modifications, and variations as falling within the true scope and spirit of the present invention.

What is claimed is:

1. A junction box comprising:
   a connector connection circuit and a fuse connection circuit containable in said junction box are separable from each other in order to form a connector module and a fuse module, respectively, wherein said circuits in said connector and fuse modules are connected to one another including at least one of connected circuits and separated circuits;

said connector module includes stacked circuit boards, each circuit board has a first insulation board and connector bus bars secured to said first insulation board, and said fuse module includes a second insulation board and fuse bus bars that are secured to said second insulation board and said fuse bus bars are connected to fuse terminals, each fuse terminal corresponding to a fuse;

said fuse bus bars in said fuse module having press contact terminals that are connected to said fuse terminals and are disposed closely in parallel with each other;

said connected circuits are connectable and said separate circuits are separable to produce a specified circuit corresponding to any of all circuit specifications in different kinds of and a same kind of automobile vehicles, each said specified circuit mounts the junction box, said fuse bus bars constituting said connected circuits being integrally connected by bridging portions, and said separated circuits are separable in accordance with the specified circuit specification that mounts said fuse bus bars, said specified circuit being alterable by cutting off said bridging portions.

2. The junction box according to claim 1, wherein the fuse bus bars are formed from a sheet of conductive metal plate.

3. The junction box according to claim 1, wherein the fuse bus bars further include tabs that can be cut off.

* * * * *